`US011595085B1`

United States Patent
Chang et al.

(10) Patent No.: US 11,595,085 B1
(45) Date of Patent: Feb. 28, 2023

(54) SYSTEM AND METHOD FOR REDUCING CO-LOCATE WIRELESS CHARGING COIL AND WWAN OR WLAN ANTENNAS RADIO FREQUENCY EXPOSURE TO END USER

(71) Applicant: Dell Products, LP, Round Rock, TX (US)

(72) Inventors: Ching Wei Chang, Cedar Park, TX (US); Chih Tsung Wu, Taipei (TW)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/511,902

(22) Filed: Oct. 27, 2021

(51) Int. Cl.
*H02J 50/80* (2016.01)
*H02J 50/20* (2016.01)
*H02J 50/40* (2016.01)
*H02J 50/90* (2016.01)
*H04W 72/12* (2009.01)
*H04B 5/00* (2006.01)
*H04B 5/02* (2006.01)
*H04W 72/1263* (2023.01)

(52) U.S. Cl.
CPC ......... *H04B 5/0075* (2013.01); *H04B 5/0031* (2013.01); *H04B 5/0037* (2013.01); *H04W 72/1263* (2013.01)

(58) Field of Classification Search
None
See application file for complete search history.

(56) References Cited

U.S. PATENT DOCUMENTS

| | | | | |
|---|---|---|---|---|
| 9,184,632 B2 * | 11/2015 | Kirby | ........................ | H02J 50/20 |
| 9,240,824 B2 * | 1/2016 | Hillan | ...................... | H04B 5/00 |
| 9,367,149 B2 * | 6/2016 | Dowd | ................. | G06F 3/03545 |
| 9,660,477 B2 * | 5/2017 | Dowd | ...................... | H02J 7/342 |
| 9,825,358 B2 * | 11/2017 | Chen | ........................ | H02J 50/23 |
| 9,871,291 B2 * | 1/2018 | Chen | ...................... | H01Q 15/002 |
| 10,277,059 B2 * | 4/2019 | Der | ........................ | H02J 50/12 |
| 10,511,348 B2 * | 12/2019 | Hong | ................... | H04B 1/3888 |
| 10,554,052 B2 * | 2/2020 | Bell | ........................ | H02J 50/402 |
| 10,897,154 B2 * | 1/2021 | Van Wageningen | ........................ | H02J 7/00309 |
| 10,910,882 B2 * | 2/2021 | Smith | ...................... | G06F 21/44 |
| 11,042,250 B2 * | 6/2021 | Missig | ................ | G06F 3/04847 |
| 11,368,192 B2 * | 6/2022 | Hong | ................... | H04B 5/0031 |
| 2011/0163713 A1 * | 7/2011 | Wang | ...................... | H02J 50/80 320/108 |
| 2018/0254639 A1 * | 9/2018 | Bell | ........................ | H02J 50/20 |
| 2018/0309315 A1 * | 10/2018 | Der | ................... | H02J 7/007192 |
| 2021/0167638 A1 * | 6/2021 | Yahagi | ...................... | H02J 50/40 |
| 2021/0184730 A1 * | 6/2021 | Hong | ...................... | H04W 12/06 |
| 2022/0051065 A1 * | 2/2022 | Goodchild | .............. | H02J 50/80 |

* cited by examiner

*Primary Examiner* — Tuan A Tran
(74) *Attorney, Agent, or Firm* — Prol Intellectual Property Law, PLLC; H. Kenneth Prol

(57) ABSTRACT

An information handling system with a wireless charging device may include a processor; a memory; a power management unit (PMU); an antenna controller to provide instructions to a radio to cause an antenna to transceive wirelessly with a network; a wireless charging scheduling controller configured to: receive transmission scheduling data from the antenna controller descriptive of when the radio is transmitting and receiving data to and from the network; and initiate, at a charging coil of the wireless charging device, a charging procedure to wirelessly charge a power storage device when the transmission scheduling data indicates that the radio is receiving data from the network or is idle.

20 Claims, 7 Drawing Sheets

SYSTEM AND METHOD FOR REDUCING CO-LOCATE WIRELESS CHARGING COIL AND WWAN OR WLAN ANTENNAS RADIO FREQUENCY EXPOSURE TO END USER

FIELD OF THE DISCLOSURE

The present disclosure generally relates to a wireless charging device of, for example, an information handling system. The present disclosure more specifically relates to the co-location of a wireless charging device and an antenna in a housing of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a stylus having its own battery and a battery of the information handling system that may be charged wirelessly.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
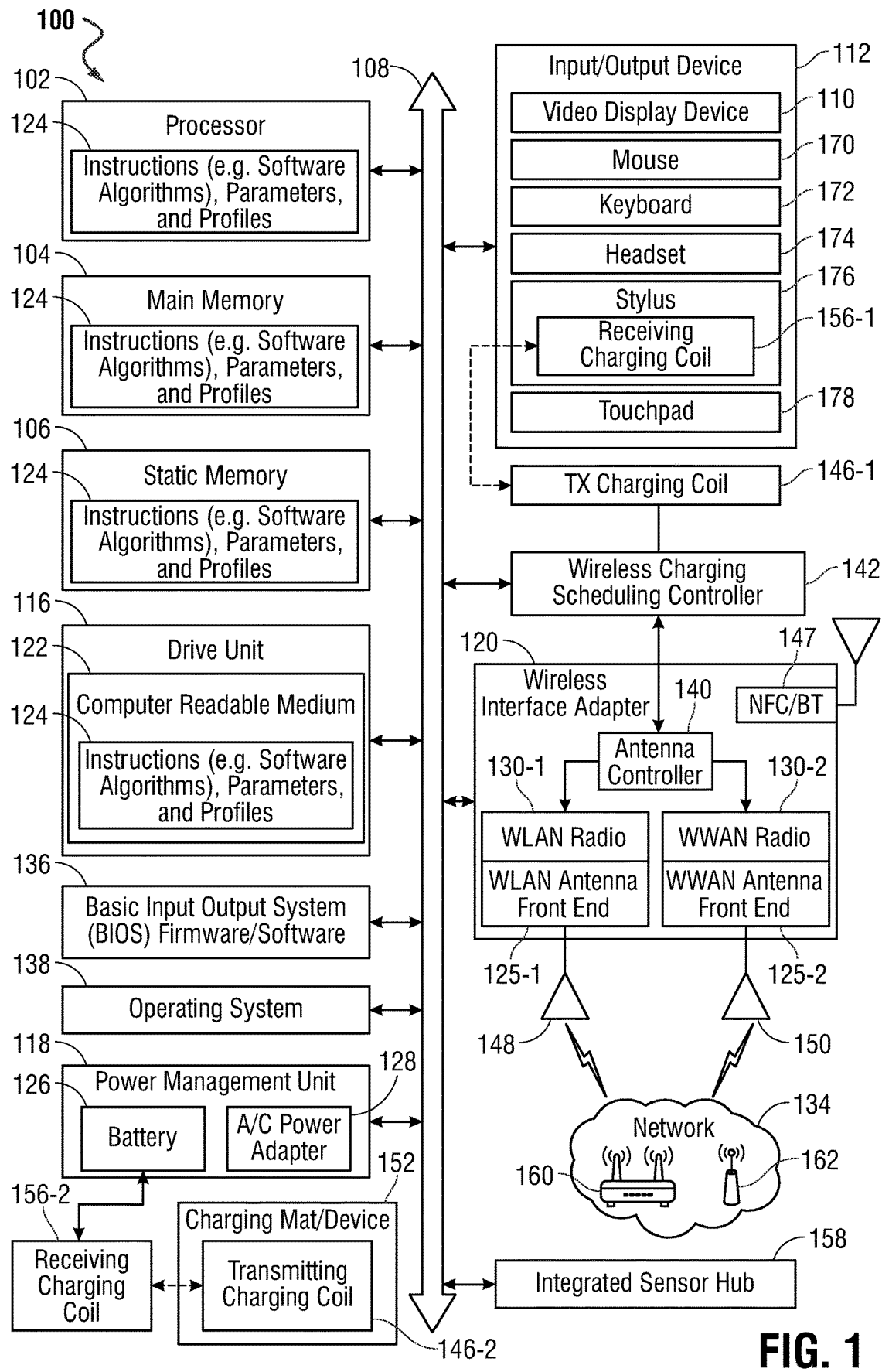
FIG. 1 is a block diagram illustrating an information handling system with wireless charging according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Embodiments of the present disclosure provide for a system and method to reduce a specific absorption rate (SAR) of electromagnetic (EM) radiation at a charging coil co-located with or near one or more antennas. With the progression and complexity of multiple wireless communication systems (e.g., antennas) integrated into an information handling system the complexity of how these communication systems interact with each other increases especially when there are multiple transceiving antennas in close proximity to one another. This complexity is further increased with the inclusion of, for example, a charging coil used to charge various power storage devices (e.g., batteries) in the information handling system or a peripheral device of the information handling system via inductive charging. Indeed, in order to achieve the best wireless performance so as to maximize full functionality out of these different wireless technologies, an information handling system may be designed to be compliant to regulatory requirements when multiple transmitting antennas are in the information handling system. One such regulation is a regulation on the amount of EM radiation emitted by these wireless communication devices. The SAR rate may be measured and kept at or below a threshold level so as to protect the user's boy from potential adverse effects of the exposure to this EM radiation. In an embodiment, the charging coil may be used to charge a battery within a peripheral device (e.g., a stylus) or the information handling system. Without the charging coil and in order to meet SAR level requirements, power reduction may be around 15 dBm in power. With the charging coil proximate to the antennas, the power may need to be reduced more when the antennas are transmitting.

For an information handling system that includes multiple transceiving antennas, co-located with each other, these SAR regulations are measured and considered for all transceiving antennas and for all technologies emitting radio frequency radiation operating concurrently. The detected SAR data should not exceed these regulatory limits. As a result, a reduction in power of one wireless technology over another or the placement of additional hardware at varied locations to regulate power for human proximity and SAR exposure may operate in the information handling system causing additional cost and space occupancy.

The present specification describes an information handling system with a wireless charging device that includes a processor, a memory, a power management unit (PMU), and a wireless interface adapter operatively coupled to an antenna controller used to provide instructions to a radio to cause an antenna to transceive wirelessly to a network. The wireless interface adapter may include a plurality of radios each operating using a different wireless technology with a radio protocol subsystem as described herein. The information handling system also includes a microcontroller unit or other controller executing instructions to operate as a wireless charging scheduling controller to receive transmission scheduling data from the antenna controller descriptive of when the radio is transmitting and receiving data to and from the network and initiate, at a charging coil of the wireless charging device, a charging procedure to wirelessly charge a power storage device when the transmission scheduling data indicates that the radio is receiving data from the network or the radio is not transceiving.

As described herein, a transmitting charging coil in the information handling system may wirelessly interact with a receiving charging coil and battery formed in one of a stylus or any other peripheral device associated with the information handling system in one embodiment. In another embodiment, a charging coil within the information handling system may receive charge from an external, transmitting charging coil in a wireless charging pad, wireless charging puck, a docking station, or other wireless charging device having a transmitting charging coil. In an embodiment, the charging coil may be referred to as a transmitting (TX) charging coil that inductively charges the battery or other power storage device via electromagnetic (EM) induction. This process includes passing alternating current through an induction coil (e.g., the TX charging coil) thereby creating a magnetic field which fluctuates in strength due to the change amplitude in the current. This created magnetic field is received at a receiving (RX) charging coil at the device which similarly fluctuates in strength due to the change amplitude in the inducted current therein. This RX charging coil changes the fluctuating magnetic field into an alternating electric current and may pass that alternating electric current through a rectifier to convert it to a direct current (DC) used to charge the battery or other power storage device within the peripheral device or information handling system. It is appreciated, however, that the creation of the electromagnetic (EM) field for charging along with the radio frequency (RF) EM signals emitted by the antennas of the information handling system may result in the SAR levels to exceed approved levels. The present specification in one embodiment describes a system where the wireless charging scheduling controller initiates the inductive charging process at the TX charging coil when nearby antenna systems or the antenna systems within the information handling system are receiving data and transmitted RF signals are not present. In another embodiment, the present specification describes a system where, by acting in concert with an antenna controller, the wireless charging scheduling controller may pause the charging process when data transmissions from any of the antennas are initiated, when nearby antenna systems are not transceiving (e.g., idle), or are turned off. By doing so, the devices may be charged while the SAR levels are kept to levels acceptable for use by the user during transmission.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as various input and output (I/O) devices 112, such as a keyboard 172, the touchpad 178, a touchpad 178, a mouse 170, a headset 174, a stylus 176, a video/graphic display 110, or any combination thereof. In an embodiment, the information handling system 100 may also be operatively coupled to a charging mat 152 or other charging device which may interact with the information handling system described herein. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 executable by the antenna controller 140, wireless charging scheduling controller 142, or any other processing device, and drive unit 116 (volatile (e.g., random-access memory, etc.), nonvolatile memory (read-only memory, flash memory etc.) or any combination thereof. The information handling system 100 may also include one or more buses 108 operable to transmit communications between the various hardware components such as any combination of various input and output (I/O) devices.

The information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an input device 112 that allows the user to interface with the information handling system 100 via the video display device 110, such as a cursor control device (e.g., the mouse 170, touchpad 178, or gesture or touch screen input), and the keyboard 172 or stylus 176, among others. Various drivers and control electronics may be operatively coupled to operate the charging mat 152 or other charging device and input/output devices 112 such as the stylus 176 according to the embodiments described herein.

The network interface device in FIG. 1 is shown as wireless interface adapter 120 but may also be a wired network interface device as is understood in the art and may provide connectivity to a network 134, e.g., a wide area network (WAN), a local area network (LAN), wireless local area network (WLAN), a wireless personal area network (WPAN), a wireless wide area network (WWAN), or other network. The network interface device shown as wireless interface adapter 120 may provide connectivity to a network 134 via operation of a WLAN radio 130-1 and WLAN antenna front end 125-1 and/or a WWAN radio 130-2 and WWAN antenna front end 125-2 being controlled by an antenna controller 140. It is appreciated that any number of radios 130-1 and 130-2 and RF front ends 125-1 and 125-2 may be associated with a plurality of antennas within the information handling system and may operate under any wireless protocol described herein. Connectivity may be via wired or wireless connection. The wireless interface adapter 120 may operate in accordance with any wireless data communication standards. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 120 may operate two or more wireless links. Information handling systems including those that are mobile in embodiments of the present disclosure may employ a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system may support multi-RAT radios (4G, 5G, WLAN) that require simultaneous transmission using multiple antennas to support various modes of transmission (e.g., uplink (UL) MIMO and 5G E-UTRAN new radio (EN-DC)). With 5G technology, these information handling systems may use 4×4 sub-6 GHz antennas and 2×2 mmWave antennas, while WLAN supports 2×2 antennas, resulting in a total of 8 antennas, out of which 4 of the WWAN 5G antennas transmit to support EN-DC mode, while 2 of the WLAN antennas concurrently transmit during an UL MIMO operation, totaling to 6 transmit antennas in the information handling system in one example embodiment.

Wireless interface adapter 120 may connect to any combination of macro-cellular wireless connections including 2G, 2.5G, 3G, 4G, 5G or the like from one or more service providers or privately administered network providers. Wireless interface adapter 120 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 may communicate voice, video or data over the network 134. Further, the instructions 124 may be transmitted or received over the network 128 via the network interface device or wireless interface adapter 120.

The information handling system 100 may include a set of instructions 124 that may be executed to cause the computer system to perform any one or more of the methods or computer-based functions disclosed herein. For example, instructions 124 may be executed by an antenna controller 140 and wireless charging scheduling controller 142, and may include software agents, or other aspects or components used to execute the methods and systems described herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Additionally, execution of the instructions described herein may be via execution of firmware by the antenna controller 140 and/or wireless charging scheduling controller 142.

The disk drive unit 116 may include a computer-readable medium 122 in which one or more sets of instructions 124 such as software may be embedded and executed by the antenna controller 140 and/or wireless charging scheduling controller 142, in an embodiment. Similarly, main memory 104 and static memory 106 may also contain a computer-readable medium for storage of one or more sets of instructions, parameters, or profiles 124 including wireless charging scheduling instructions that allow for a user to initiate a charging schedule via the wireless charging scheduling controller 142 as described herein. The disk drive unit 116 and static memory 106 may also contain space for data storage. Further, the instructions 124 may embody one or more of the methods or logic as described herein. For example, instructions relating to and executed by the wireless charging scheduling controller 142, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the instructions 124 to be executed by a processor 102 for software applications or the wireless charging scheduling controller 142 may be executed locally, remotely or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed by the wireless charging scheduling controller 142 and antenna controller 140 may be stored in static memory 106, or the drive unit 116 on a computer-readable medium 122 such as a flash memory or magnetic disk in an example embodiment.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described herein, the information handling system 100 includes a wireless charging scheduling controller 142. The wireless charging scheduling controller 142 may, in an embodiment, be part of the processor 102, a microcontroller unit (MCU), and embedded controller (EC), or another individual processing device used to coordinate with the antenna controller 140 to selectively charge the power storage devices (e.g., rechargeable battery) within the information handling system 100 and to control wireless charging of an input/output device 112 such as the stylus 176. During operation of the information handling system 100 and in order to reduce the SAR levels experienced by the user at or around the charging coil 146-1 and WLAN antenna 148 and/or WWAN antenna 150, the wireless charging scheduling controller 142 may receive transmission scheduling data from the antenna controller 140. This transmission scheduling data describes when the radios 130-1, 130-2 are or will be transmitting and receiving data to and from the network 134. The wireless charging scheduling controller 142 may then initiate a charging process only when the transmission scheduling data from the antenna controller 140 indicates that the WLAN antenna 148 and/or WWAN antenna 150 are to receive data from the communications established between the information handling system 100 and network 134 or the radios 130-1, 130-2 are scheduled to be dormant or are off. Indeed, as the WLAN antenna 148 and/or WWAN antenna 150 operatively communicate with either of a base station 162 or wireless access point 160, the data transmission time, data reception time, or idle time may be detailed in the transmission scheduling data provided to the wireless charging scheduling controller 142. In an embodiment, the transmission scheduling data may also provide data related to when the radios 130-1, 130-2 are off. This data, in an embodiment, may originate from the antenna controller 140, the BIOS 136, an EC or other hardware via execution of software used to provide this data. As the transmission scheduling data is accessed by the wireless charging scheduling controller 142, the wireless charging scheduling controller 142 may schedule when the transmitting (TX) charging coil 146-1 is to operate thereby charging a power storage device of the stylus 176 or within the information handling system 100.

As described herein, the stylus 176 may include a receiving (RX) charging coil 156-1. This RX charging coil 156-1 receives a fluctuating magnetic field emitted from the charging coil 146-1 at the information handling system 100. This fluctuating magnetic field is converted back into alternating current at the RX charging coil 156-1 of the stylus 176 and, in an embodiment, converted into DC via a rectifier and used to either power the stylus 176 or charge a power storage device in the stylus 176. This process of charging is done only when the transmission scheduling data received at the wireless charging scheduling controller 142 indicates that the WLAN antenna 148 and/or WWAN antenna 150 are not, at least, transmitting data and, in an embodiment, receiving data instead. This control over either or both the WLAN antenna 148 and/or WWAN antenna 150 in some embodiments may depend on proximity from the TX charging coil 146-1 and either or both the WLAN antenna 148 and/or WWAN antenna 150. In this example embodiment, those WLAN antennas 148 or WWAN antennas 150 that are close to the TX charging coils 146-1, 146-2 may be monitored and charging may commence when the transmission scheduling data indicates that these proximate antennas are receiving data, idle, or off. This process reduces the SAR levels emitted by the combination of EM radiation emitted during the operation of the WLAN antenna 148, the WWAN antenna 150, and charging coil 146-1.

In an embodiment, the information handling system 100 may be operatively coupled to a charging mat 152 or other charging device or other charging device such a charging puck, charging coil in a docking station, or other contemplated systems to interface with information handling system 100. The charging mat 152 or other charging device or other charging device may also include a transmitting charging coil 146-2. The charging mat 152 or other charging device may, in an embodiment, be operatively coupled to the wireless charging scheduling controller 142 via a wired connection or wireless connection such as a near-field communication (NFC), Bluetooth (BT) or other wireless link via radio 147 to the information handling system 100. In an embodiment, the wireless link via radio 147 and the information handling system 100 may communicate to perform a handshake procedure prior to initiating a charging procedure by the wireless charging scheduling controller 142. In the embodiments described herein, the transmitting charging coils 146-1, 146-2 and RX charging coils 156-1, 156-2 cooperate to transfer power to a battery 126 within the information handling system 100 until charging is complete.

In an embodiment, the charging mat 152 or other charging device may be placed under the information handling system 100 and include a wired communication line operatively coupled to a docking station to which the information handling system 100 is docked with wirelessly. The placement of the transmitting charging coil 146-2 of the charging mat 152 or other charging device may be situated so as to have a TX charging coil 146-2 operatively coupled to a receiving coil 156-2 within the information handling system 100 as indicated by the dashed line in FIG. 1. The receiving coil 156-2 within the information handling system 100 may be operatively coupled, in an embodiment, to the battery 126 associated with the power management unit (PMU) 118 as described herein. The wireless or wired connection between the charging mat 152 or other charging device and the information handling system 100 may allow the wireless charging scheduling controller 142 to use the transmission scheduling data received from the antenna controller 140 to also operate the transmitting charging coil 146-2 within the charging mat 152 or other charging device to charge the battery 126 in the information handling system 100. A similar process of inductively charging the battery 126 of the information handling system 100 may be conducted via the wireless charging scheduling controller 142 similar to the wireless charging of the power storage device of the stylus 176 is conducted as described herein.

In an embodiment, other sensors may be provided in either or all of the information handling system 100, the stylus 176, or charging mat 152 or other charging device to detect the proximity of the stylus 176 and charging mat 152 or other charging device relative to the information handling system 100. These proximity sensors may cause the wireless charging scheduling controller 142 to confirm the presence of the stylus 176 and/or charging mat 152 or other charging device in order to initiate the wireless charging scheduling control system described herein. In an embodiment, the charging coil 146-1 of the information handling system 100 and transmitting charging coil 146-2 of the charging mat 152 or other charging device may be operated to control whether power transmissions are being received at the RX charging coil 156-1 of the stylus 176 or receiving coil 156-2 of the information handling system 100 only when no transmission occurs at one or more proximate WLAN antennas 148 and/or WWAN antennas 150 on the chassis of the information handling system 100.

The wireless charging process described herein includes the use of a wireless charging schedule determined to avoid the transmission timings of the WLAN antenna 148 and/or WWAN antenna 150. The method and systems of the information handling system 100 and wireless charging scheduling controller 142 enables the wireless charging scheduling controller 142 to be synchronized with the transmission and reception timings of the WLAN radios 130-1 and WWAN radios 130-2 such that the wireless charging scheduling controller 142 may initiate charging or pause charging based on whether transmission from the WLAN antenna 148 and/or WWAN antenna 150 are paused or not, respectively. The processes and method described herein may result in an effective charging time of the batteries in the information handling system 100 or stylus 176 by coordinating the charging of the batteries while still reducing the SAR levels. In an embodiment, better wireless coverage or data throughput may also be achieved based on the operations of those antennas by also reducing the SAR levels allowing the transmissions of the WLAN antennas 148 and/or WWAN antennas 150 to be prioritized and not be subjected to power limitations in order to avoid higher SAR levels. Here, the batteries may be charged while operation of the WLAN antenna 148 and WWAN antenna 150 may remain unaffected, in an embodiment, thereby allowing the functionalities of the information handling system 100 to remain unaffected.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

As described herein, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 114 such as the stylus 176 via the TX charging coil 146-1, and other components that may require power when a power button has been actuated by a user. In an embodiment, the PMU 118 may monitor power levels and be electrically coupled to the information handling system 100 to provide this power and coupled to bus 108 to provide or receive data or instructions. the PMU 118 may be coupled to the wireless charging scheduling controller 142 to control charging functions of the information handling system 100. The PMU 118 may regulate power from a power source such as a battery 126 or A/C power adapter 128. In an embodiment, the battery 126 may be charged via the A/C power adapter 128 such as the RX charging coils 156-2 and provide power to the components of the information handling system 100 via a TX charging coil 146-1, wired connections as applicable, or when A/C power from the A/C power adapter 128 is removed.

In an embodiment, the information handling system 100 may include an integrated sensor hub 158. The integrated sensor hub 158 may further include other sensors such as a Hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In an embodiment, the integrated sensor hub 158 may receive data from a magnet or a Hall effect sensor indicating that an input/output device is in close proximity to a TX charging coil 146-1, 146-2 in order to provide a signal to the antenna controller 140 or wireless charging scheduling controller 142 indicating whether to initiate a charging process as described herein. In an embodiment, the integrated sensor hub 158 may detect the presence of an RX charging coil 156-1, 156-2 via an NFC signal initiated via activation of the RX charging coil 156-1, 156-2 when brought into presence of the TX charging coil 146-1, 146-2 thereby aligning the RX charging coil 156-1, 156-2 and TX charging coil 146-1, 146-2. In an embodiment, the integrated censor hub 158 may be operatively coupled to the PMU 118 to detect, at the battery 126, the presence of a TX charging coil 146-1, 146-2.

The information handling system 100 may include one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize the information handling system 100 on power up, to launch an OS 138, and to manage input and output interactions between the OS 138 and the other elements of information handling system 100 including the haptic touchpad 178 described herein. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of the information handling system 100. For example, application programs and BIOS firmware/software 110 can reside in drive 116, in a ROM (not illustrated) associated with the information handling system 100, in an option-ROM (not illustrated) associated with various devices of the information handling system 100, in a storage system (not illustrated) associated with network channel of a wireless interface adapter 120, in another storage medium of the information handling system 100, or a combination thereof. Executable code instructions 124 for application programs and BIOS firmware/software 136 can each be implemented as single programs, or as separate programs carrying out the various features as described herein.

Figure 2:
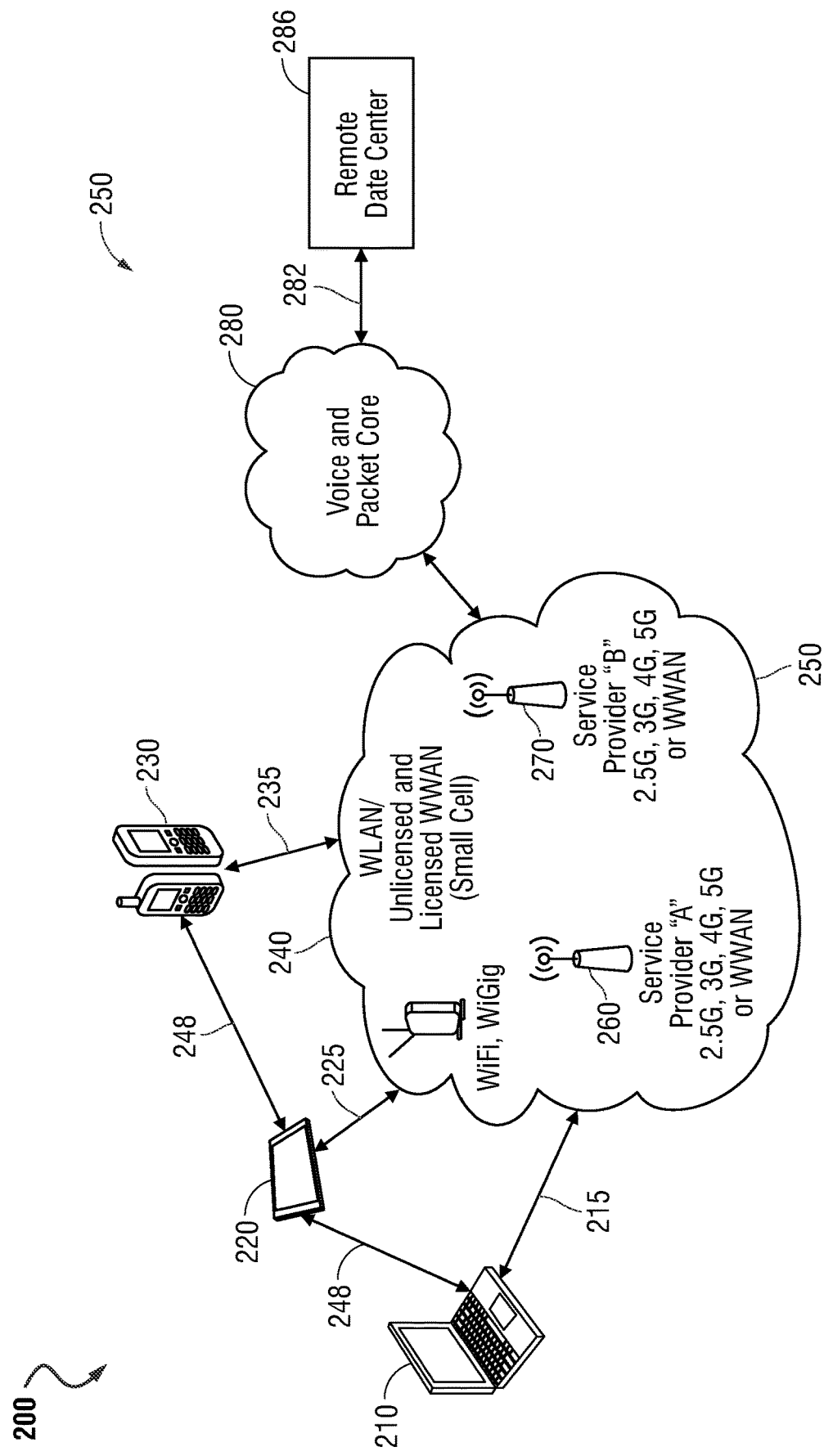
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the information handling system 100 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option Since WPAN or Wi-Fi Direct connection 248 and WWAN networks can functionally operate similar to WLANs, they may be considered as wireless local area networks (WLANs) for purposes herein. In an embodiment, the endpoint devices 210, 220, 230 that form part of this WLAN may be considered and organization. Components of a WLAN may be connected by wireline or Ethernet connections to a wider external network such as a voice and packet core 280. For example, wireless network access points or base stations may be connected to a wireless network controller and an Ethernet switch similar to that described in connection with FIG. 1. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or 5G small cell WWAN communications such as gNodeB, eNodeB, or similar wireless network protocols and access points. Alternatively, other available wireless links within network 240 may include macro-cellular connections 250 via one or more service providers 260 and 270. Again, as described herein, the organization of a number of endpoint devices 210, 220, 230 may be defined by the endpoint devices 210, 220, 230 accessing a specific or number of specific base stations. As described herein, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, upcoming 3GPP protocols, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz or, in an embodiment, 960 Mhz. Mid-band 5G may operate at frequencies in an FR1 range between 1.8 and 5 GHz. Additionally, high-band 5G frequencies may operate at 25 to 39 GHz and even higher. In additional examples, WWAN carrier licensed bands may operate at the new radio frequency range 1 (NRFR1), NRFR2, bands, and other known bands as described herein per the operation of the converged 5G antenna. Each of these frequencies used to communicate over the network 240 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint device 210, 220, 230 may each have a plurality of wireless network interface systems or radio protocol subsystems capable of transmitting simultaneously within several communication bands or even utilizing a shared communication frequency band access multiple protocols. That communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. As described herein, each of the endpoint devices 210, 220, 230 may include a 5G antennas that are capable of transmitting and receiving data using an FR1 and FR2 frequency concurrently to communicate with multiple networks. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in emerging 5G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas thus limiting further available antenna locations and causing some antennas to be placed proximate to charging coils on the information handling system 100. The antenna may be a transmitting antenna that includes high-band, medium-band, low-band, and unlicensed band transmitting antennas in embodiments herein. The antenna may cooperate with other antennas in a N×N MIMO (where "N" is any number) array configuration according to the embodiments described herein. Alternatively, embodiments may include a single transceiving antennas capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and remote data center 286 or connection to other additional wireless networks may be via Ethernet or another similar connection to the worldwide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include one or more servers. In another embodiment, the on-demand network slice overlay optimization system 201 may be directly accessible by the endpoint devices 210, 220, 230 via the one or more networks. Having such remote capabilities may permit fewer resources to be maintained at the mobile endpoint devices 210, 220, 230 allowing streamlining and efficiency within those devices. Similarly, remote data center permits fewer resources to be maintained in other parts of network 200.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

Figure 3:
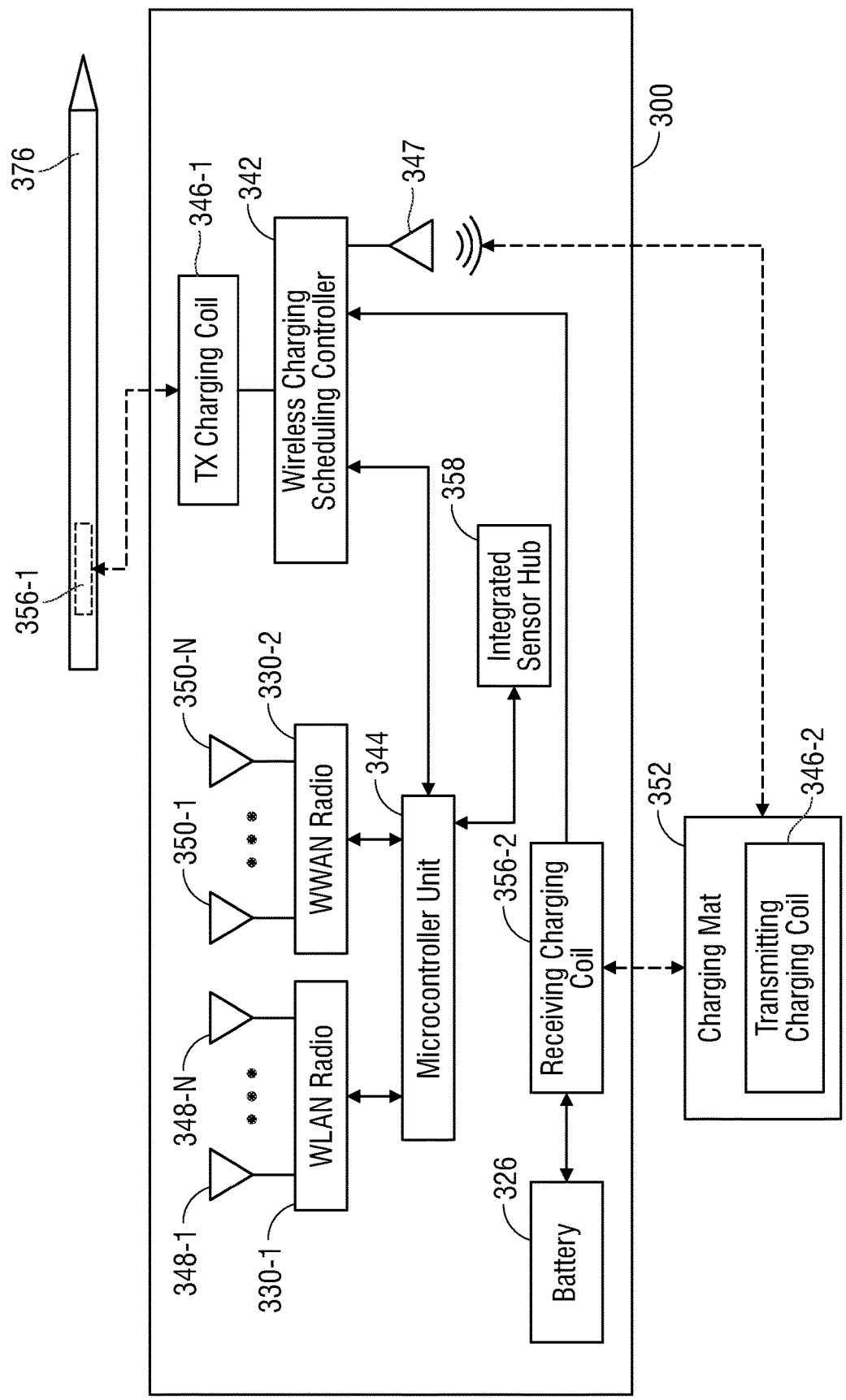
FIG. 3 is a block diagram of a wireless charging scheduling system with a wireless charging system and radio systems according to an embodiment of the present disclosure.

FIG. 3 is a block diagram of a wireless charging scheduling system of an information handling system 300 according to an embodiment of the present disclosure. The wireless charging scheduling system may be part of an antenna control system within an information handling system. As described herein, the wireless charging scheduling system includes a wireless charging scheduling controller 342. The wireless charging scheduling controller 342 may, in an embodiment, be part of a processor within an information handling system 300 or may be an individual processing device such as an MCU, EC, or other processing device (e.g., within the PMU) used to coordinate with an antenna controller, for example, to selectively charge the power storage devices (e.g., rechargeable battery) within the information handling system 300 and/or the at an input/output devices such as the stylus 376. During operation of the wireless charging system and in order to reduce the SAR levels experienced by the user at or around the charging coil 346 and WLAN antennas 348-1 and 348-N and/or WWAN antennas 350-1 and 350-N, the wireless charging scheduling controller 342 may receive transmission scheduling data from the antenna controller 340. This transmission scheduling data describes when the WLAN radio 330-1 and/or WWAN radio 330-2 is or will be transmitting and receiving data to and from a wireless network.

The wireless charging scheduling controller 342 may then initiate a charging process only when the transmission scheduling data from the antenna controller 340 indicates that the WLAN antennas 348-1 and 348-N and/or WWAN antennas 350-1 and 350-N are to receive data from the communications established between the information handling system 300 and the wireless network, are idle, or are turned off. Indeed, as the WLAN antennas 348-1 and 348-N and/or WWAN antennas 350-1 and 350-N operatively communicate with either of a base station or wireless access point, the data transmission time and data reception time may be detailed in the transmission scheduling data provided to the wireless charging scheduling controller 342. As the transmission scheduling data is accessed by the wireless charging scheduling controller 342, the wireless charging scheduling controller 342 may schedule when the charging coil 346 is to operate thereby charging a power storage device of the stylus 376 or within the information handling system 300 based on whether a proximate WLAN antenna 348-1 and 348-N and/or WWAN antenna 350-1 and 350-N is receiving data, idle, or turned off.

As described herein, the stylus 376 or other input/output device may include an RX charging coil 356-1. This RX charging coil 356-1 receives a fluctuating magnetic field emitted from the TX charging coil 346-1 at the information handling system 300. This fluctuating magnetic field is converted back into alternating current at the RX charging coil 356-1 of the stylus 376 or other input/output device and, in an embodiment, converted into DC via a rectifier and used to either power the stylus 376 or other input/output device or charge a power storage device in the stylus 376 or other input/output device. This process of charging is done only when the transmission scheduling data received at the wireless charging scheduling controller 342 indicates that the WLAN radio 330-1 and/or WWAN radio 330-2 are not, at least, transmitting data and, in an embodiment, receiving data, or are idle/off instead. This reduces the SAR levels emitted by the combination of EM radiation emitted during the operation of the WLAN radio 330-1 or the WWAN radio 330-2, and TX charging coil 346-1.

In an embodiment described in connection with FIG. 1, the information handling system 300 may be operatively coupled to a charging mat 352 or other charging device that may have a TX charging coil 346-2 which operate similar to the charging coil 346-1 in FIG. 3 in order to charge a battery within the information handling system 300. The information handling system 300 may also include a RX charging coil 356-2 similar to the RX charging coil 356-1 in connection with the stylus 376 or other input/output device. The charging mat 352 or other charging device may, in an embodiment, be operatively coupled to the wireless charging scheduling controller 342 via a wired connection or a wireless connection 347 such as an NFC, BT, or other wireless connection to the information handling system 300. In an embodiment, the charging mat 352 or other charging device may be placed under the information handling system 300 and include a wired communication line or wireless link operatively coupled to or a docking station (not shown) to which the information handling system 300 is docked. The placement of the TX charging coil 346-2 of the charging mat 352 or other charging device may be situated so as to be operatively couple to a RX charging coil 356-2 within the information handling system 300. The RX charging coil 356-2 within the information handling system 300 may be operatively coupled, in an embodiment, to a battery 326 associated with the PMU of the information handling system 300 as described herein. The wired connection or wireless connection via the wireless connection 347 between the charging mat 352 or other charging device and the information handling system 300 may allow the wireless charging scheduling controller 342 to use the transmission scheduling data received from the antenna controller 340 to also operate the TX charging coil 346-2 within the charging mat 352 or other charging device to charge the battery 326 in the information handling system 300. A similar process of inductively charging the battery 326 of the information handling system 300 may be conducted via the wireless charging scheduling controller 342 as the charging of the power storage device of the stylus 376 is conducted as described herein.

In an embodiment, other sensors may be provided in either or all of the information handling system, the stylus 376, other input/output device, or charging mat 352 or other charging device to detect the proximity of the stylus 376 or other input/output device or charging mat 352 or other charging device relative to the information handling system 300. These proximity sensors may cause the wireless charging scheduling controller 342 to confirm the presence of the stylus 376, other input/output devices, and/or charging mat in order to initiate the wireless charging scheduling system described herein. In an embodiment, the TX charging coil 346-1 of the information handling system 300 and TX charging coil 346-2 of the charging mat 352 or other charging device may be controlled based on determination of whether power transmissions are being received at the RX charging coil 356-1 of the stylus 376 or RX charging coil 356-2 of the information handling system 300 when at least one of the WLAN antennas 348-1 and 348-N or WWAN antennas 350-1 and 350-N proximate to the RX charging coil 356-2 or TX charging coil 346-1 is detected as transmitting a wireless signal.

As indicated in FIG. 3, the number of WLAN antennas 348-1 and 348-N and WWAN antennas 350-1 and 350-N may be more or less than those shown in FIG. 3. In a particular embodiment, the information handling system 300 may use 4×4 sub-6 GHz antennas and 2×2 mmWave antennas, while the WLAN antennas 348-1 and 348-N supports 2×2 antennas, resulting in a total of eight antennas, out of which four of the WWAN antennas 350-1 and 350-N transmit to support EN-DC mode, while two of the WLAN antennas 348-1 and 348-N concurrently transmit during an UL MIMO operation, totaling to 6 transmit antennas in the information handling system 300 in one example embodiment.

In an embodiment, the information handling system 300 may include an integrated sensor hub 358. The integrated sensor hub 358 may further include other sensors such as a Hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In an embodiment, the integrated sensor hub 358 may receive data from a magnet or a Hall effect sensor indicating that an input/output device is in close proximity to a TX charging coil 346-1, 346-2 in order to provide a signal to the antenna controller or other controller such as the microcontroller unit 344 or wireless charging scheduling controller 342 indicating whether to initiate a charging process as described herein. In an embodiment, the integrated sensor hub 358 may detect the presence of an RX charging coil 356-1, 356-2 via an NFC signal initiated via activation of the RX charging coil 356-1, 356-2 when brought into presence of the TX charging coil 346-1, 346-2 thereby aligning the RX charging coil 356-1, 356-2 and TX charging coil 346-1, 346-2. In an embodiment, the integrated censor hub 358 may be operatively coupled to the PMU associated with the battery 326 to detect, at the battery 326, the presence of a TX charging coil 346-1, 346-2.

Figure 4:
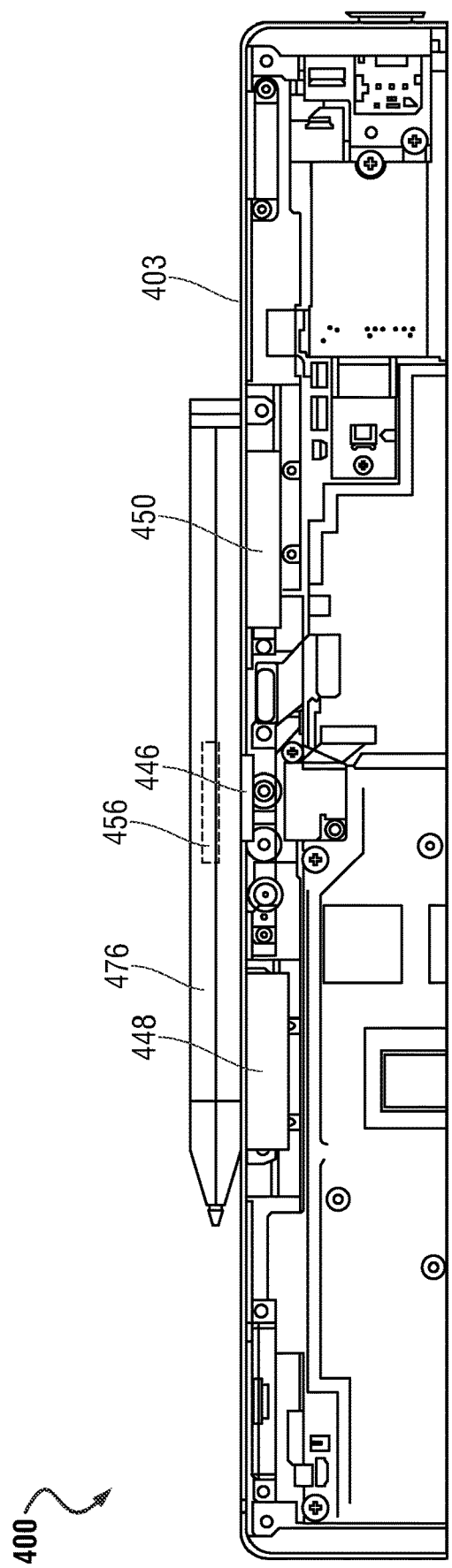
FIG. 4 is a graphic diagram of a bottom view of an information handling system and a stylus according to an embodiment of the present disclosure.

FIG. 4 is a diagram of a bottom view of an information handling system 400 and a stylus 476 according to an embodiment of the present disclosure. FIG. 4 further shows a first antenna location 448 where a first antenna may be placed (referred herein as the first antenna 448) and a second antenna location 450 where a second antenna may be placed (referred herein as the second antenna 450) formed into the information handling system 400 as indicated by the dashed lines in FIG. 4. Still further, the information handling system 400 may include an example TX charging coil location 446 (referred to herein as the TX charging coil 446) formed in the housing of the information handling system 400 and close to a sidewall 403 of the housing of the information handling system 400.

The placement of the TX charging coil 446, in the embodiment shown in FIG. 4, is close to an example first location where a first antenna 448 is located as well as a second location where a second antenna 450 is located. As described herein, the concurrent operation of the first antenna 448, second antenna 450, and TX charging coil 446, especially where either of the first antenna 448 and second antenna 450 are transmitting, increases the SAR levels at or near the TX charging coil 446 to levels that may exceed safe operational levels. Thus, where a user attempts to use the stylus 476 or is otherwise near sidewall 403, the user's hand may be subjected to levels of EM radiation that may exceed permitted exposure levels to a user. However, because the stylus 476 is to be wirelessly charged via interaction of the TX charging coil 446 and an RX charging coil location 456 (referred to here as a RX charging location 456) at the stylus 476, the management of the SAR levels is provided via execution of a wireless charging scheduling system with wireless charging scheduling controller as described herein.

In an example, the wireless charging scheduling controller may receive transmission scheduling data from an antenna controller as described herein. This transmission scheduling data describes when the radios operatively coupled to the first antenna 448 and second antenna 450 are or will be transmitting and receiving data to and from a wireless network. The wireless charging scheduling controller may then initiate a charging process only when the transmission scheduling data from the antenna controller indicates that the first antenna 448 and second antenna 450 are to receive data from the communications established between the information handling system 400 and the network are idle or are detected as off. Indeed, as the first antenna 448 and second antenna 450 operatively communicate with either of a base station or wireless access point, the data transmission time and data reception time may be detailed in the transmission scheduling data provided to the wireless charging scheduling controller. Also, indications that the radios associated with the first antenna 448 and/or second antenna 450 are idle or off may be received in the transmission scheduling data or from a wireless interface adapter driver software located at, for example, the BIOS or OS. As the transmission scheduling data is accessed by the wireless charging scheduling controller, the wireless charging scheduling controller may schedule when the TX charging coil 446 is to operate thereby charging a power storage device of the stylus 476 via the RX charging coil 456. A similar process may be conducted where the TX charging coil is within a charging mat and the RX charging coil is within the information handling system 400 as descried below in FIG. 6. By timing this charging process, the SAR levels at or near, in this example, the sidewall 403 of the information handling system 400 may be reduced thereby providing a safe location for the user to interact with the information handling system 400 or the stylus 476.

It is appreciated that the first antenna 448 and second antenna 450 may be either of a WWAN antenna or WLAN antenna. The protocols associated with the operation of these antennas 448, 450 may vary depending on the transmission purposes of the antennas 448, 450, the layout of any other antenna systems within the information handling system 400, available space to house the antennas 448, 450, among other considerations. Similarly, the placement of the TX charging coil 446 may also vary. However, as the number of antennas placed within the information handling system 400 increases, the locations where the TX charging coil 446 may be placed without an antenna nearby may also be reduced. Additionally, the effects of the SAR levels experienced at any of the first antenna 448, second antenna 450, and TX charging coil 446 may not be remedied regardless of where these elements are placed within the information handling system 400 and with respect to each other.

Figure 5:
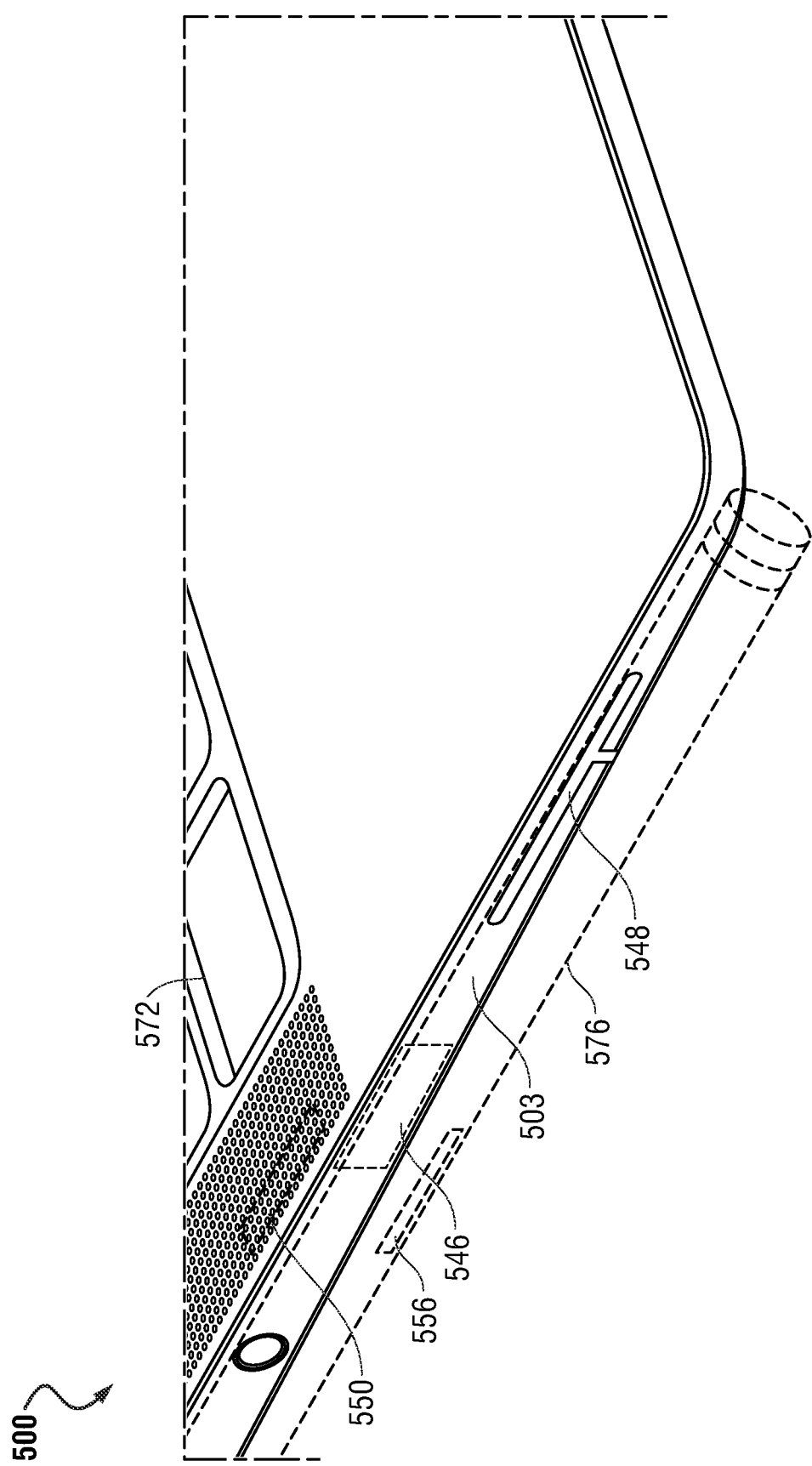
FIG. 5 is a graphic diagram of a perspective view of an information handling system and a stylus according to an embodiment of the present disclosure.

FIG. 5 is a graphic diagram of a perspective view of an information handling system 500 and a stylus 576 according to an embodiment of the present disclosure. Similar to FIG. 4, FIG. 5 also shows a first antenna location 548 (e.g., a WLAN antenna) referred to herein as a first antenna 548 or first antenna location 548 and a second antenna location 550 (e.g., a WLAN antenna) referred to herein as a second antenna 548 or a second antenna location 548 formed into the information handling system 500 as indicated by the dashed lines. The placement of the first antenna 548 shows that the antenna is formed into a housing of the information handling system 500 in order to reduce the space within the information handling system otherwise occupied by the first antenna 548. In this embodiment, a RF transparent window at the first antenna 548 shows an example location of the first antenna 548 behind which the first antenna 548 may be placed or which may form the first antenna 548. Similarly, the second antenna may be placed within a speaker housing at a second antenna location 550 to also reduce the amount of space within the information handling system 500 and to take advantage of that space that may otherwise remain unoccupied by other devices placed within the information handling system 500. Still further, the information handling system 500 may include various locations 546 for a TX charging coil (referred herein as a TX charging coil 546) and various locations 556 within the stylus 576 for an RX charging coil (referred herein as a RX charging coil 546) formed in the housing of the information handling system 500 and close to a sidewall of the housing of the information handling system 500.

Again, the placement of the TX charging coil 546, in the embodiment shown in FIG. 5, is close to the first antenna 548 and second antenna 550. As described herein, the concurrent operation of the first antenna 548, second antenna 550, and TX charging coil 546, especially where either of the first antenna 548 and second antenna 550 are transmitting, increases the SAR levels at or near the TX charging coil 546 to levels that may exceed safe operational levels. Thus, where a user attempts to use the stylus 576 or is otherwise near sidewall 503, the user's hand may be subjected to levels of EM radiation that may exceed permitted levels for a user. However, because the stylus 576 is to be wirelessly charged via interaction of the TX charging coil 546 and an RX charging coil 556 of the stylus 576, the management of the SAR levels is provided via execution of a wireless charging scheduling controller as described herein. The present specification contemplates that the information handling system 500 may include additional wirelessly connected input/output devices such as a wireless keyboard, a wireless mouse, a wireless headset, a wireless video display device, among others that also include a power storage device (e.g., batteries) that may be charged via a TX charging coil such as the TX charging coil 546 described in FIG. 5 in other various embodiments similar to the charging of stylus 576.

In an example, the wireless charging scheduling controller may receive transmission scheduling data from an antenna controller as described herein. This transmission scheduling data describes when the radios operatively coupled to the first antenna 548 and second antenna 550 are or will be transmitting and receiving data to and from a wireless network. The wireless charging scheduling controller may then initiate a charging process only when the transmission scheduling data from the antenna controller indicates that the first antenna 548 and second antenna 550 are to receive data from the communications established between the information handling system 500 and the network. Indeed, as the first antenna 548 and second antenna 550 operatively communicate with either of a base station or wireless access point, the data transmission time and data reception time may be detailed in the transmission scheduling data provided to the wireless charging scheduling controller. As the transmission scheduling data is accessed by the wireless charging scheduling controller, the wireless charging scheduling controller may schedule when the TX charging coil 546 is to operate thereby charging a power storage device of the stylus 576 via the RX charging coil 556. By timing this charging process at the TX charging coil 546 to which the first antenna 548 and second antenna 550 are not transmitting wireless signals, the SAR levels at or near, in this example, the sidewall 503 of the information handling system 500 may be reduced thereby providing a safe location for the user to interact with the information handling system 500 and the stylus 576.

FIG. 5 also shows that a keyboard 572 of the information handling system 500 is also close to the location of the first antenna 548, second antenna 550, and TX charging coil 546. Similar to the location of the stylus 576 relative to the first antenna 548, second antenna 550, and TX charging coil 546, the location of the keyboard 572 may also place the user at risk of high SAR levels if the user were to interact with the keyboard 572. Indeed, because the user's hands may be located at or near the keyboard 572 (e.g., where the information handling system 500 is placed in a tablet mode) more often than near the TX charging coil 546, the dangers presented to the user may be higher without the operation of the wireless charging scheduling controller as described herein. Other instances may occur where the user rests his or her hand next to the transmitting antenna and the TX charging coil 546 also subjecting the user's body to SAR levels.

Figure 6:
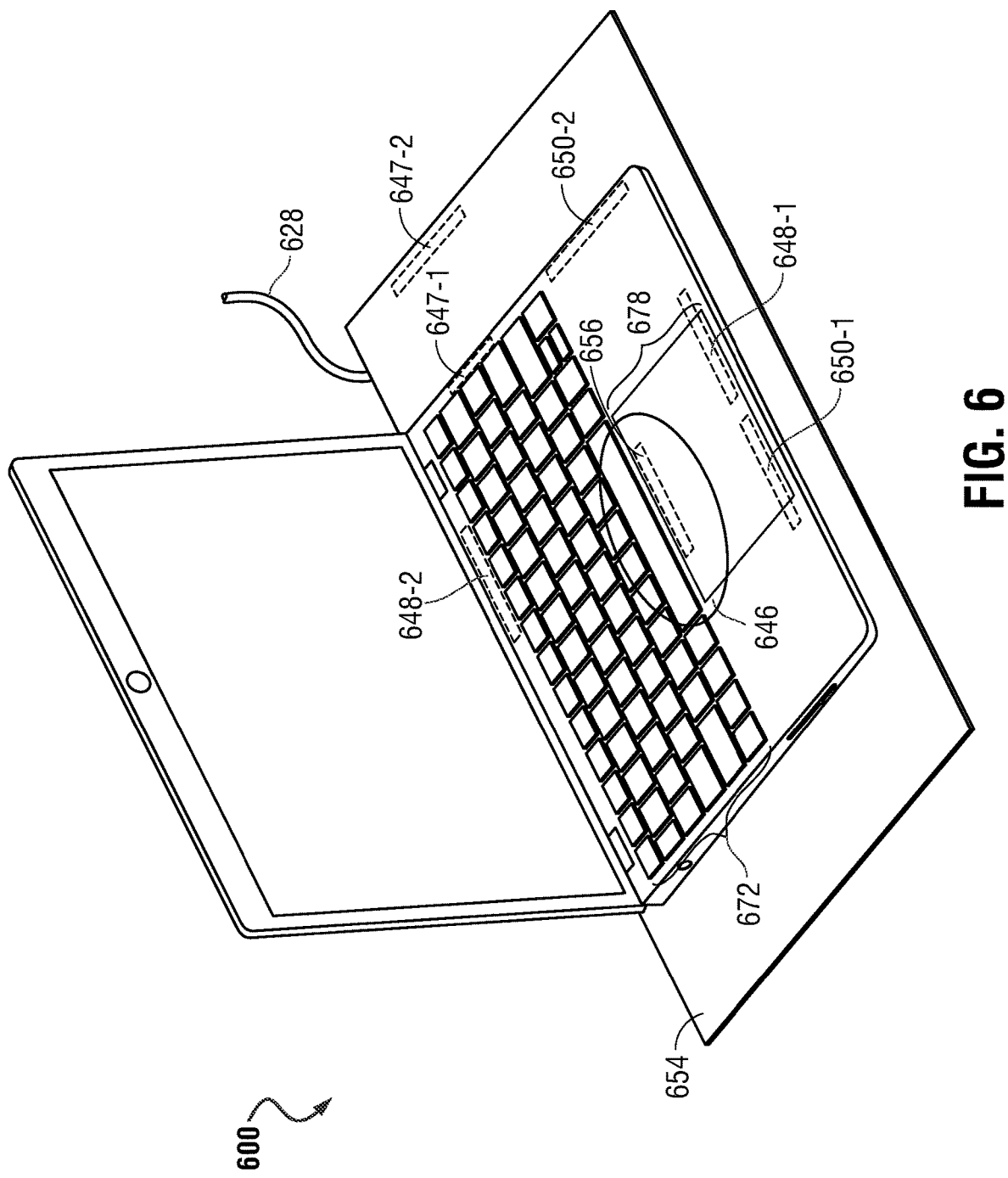
FIG. 6 is a graphic diagram of a perspective view of an information handling system and a charging mat placed thereunder according to an embodiment of the present disclosure.

FIG. 6 is a perspective view graphic diagram of an information handling system 600 and a charging mat 654 whose TX charging coil location is shown at 646 (referred to herein a TX charging coil 646) placed thereunder according to an embodiment of the present disclosure. In this embodiment, the charging mat 654 may include a material such as plastic that encases the TX charging coil 646 therein. The charging mat 654 may also include an AC power cord 628 used to operatively couple the charging mat 654 to an AC power source such as an electrical socket. It is understood that another transmitting wireless charging device according to embodiments herein may be used to charge information handling system 600 including a charging puck, a TX charging coil disposed in a docking station, a charging bar next to which information handling system 600 may be placed or another device housing a TX charging coil.

As described herein, the information handling system 600 may include a keyboard 672 as well as a touchpad 678 used as input devices to the information handling system 600. The information handling system 600, in this example embodiment, includes a first antenna 648-1, a second antenna 648-2, a third antenna 650-1, and a fourth antenna 650-2. In particular, a first antenna 648-1, a second antenna 648-2, a third antenna 650-1, and a fourth antenna 650-2 are depicted in the shown embodiment at example location where the antennas 648-1, 648-2, 650-1, and 650-2 on the information handling system 600. These locations of the antennas 648-1, 648-2, 650-1, and 650-2 will be referred to, in some aspects, as the antennas themselves.

These antennas 648-1, 648-2, 650-1, and 650-2 may each be one of a WWAN antenna or WLAN antenna as described herein. Again, although FIG. 6 shows only four antennas 648-1, 648-2, 650-1, 650-2 and specific placement of these antennas 648-1, 648-2, 650-1, 650-2, the present specification contemplates that the number of placement of these antennas 648-1, 648-2, 650-1, 650-2 may vary depending on the transmission purposes of the antennas 648-1, 648-2, 650-1, 650-2, the layout of any other antenna systems within the information handling system 500, available space to house the antennas 648-1, 648-2, 650-1, 650-2, among other considerations. FIG. 6 also shows that the information handling system 600 is a laptop-type information handling system 600. However, the present specification contemplates that other types of information handling systems such as a tablet-type information handling system and a 360-degree convertible-type information handling system, among others, is contemplated.

As described, the charging mat 654 may also include a location where a TX charging coil 646 (referred to herein as TX charging coil 646) operatively interfaces with a location of an RX charging coil 656 (referred to herein as RX charging coil 656 within the information handling system 600 where the RX charging coil 656 may be aligned with the TX charging coil 646. The charging mat 654 may, in an embodiment, be operatively coupled to the wireless charging scheduling controller via a wired connection or a wireless link system 647-1 via the NFC, BT, or other wireless link to the information handling system 600. In an embodiment, the charging mat 654 may be placed under the information handling system 600 and include a wired communication line operatively coupled to a docking station to which the information handling system 600 is docked. In an embodiment, the charging mat 654 may include an antenna 647-2 that is capable of communicating via NFC, BT, or other wireless link with the information handling system 600 wirelessly, via radio 647-1, to be operatively coupled to the wireless charging scheduling controller. The placement of the TX charging coil location 646 of the charging mat 654 may be situated so as to be operatively coupled to a RX charging coil 656 within the information handling system 600. The RX charging coil 656 within the information handling system 600 may be operatively coupled, in an embodiment, to the battery associated with the power management unit (PMU) as described herein. The wired or wireless connection 647-1, 647-2 between the charging mat 654 and the information handling system 600 may allow the wireless charging scheduling controller to use the transmission scheduling data received from the antenna controller to also operate the TX charging coil location 646 within the charging mat 654 to charge the battery in the information handling system 600. A similar process of inductively charging the battery of the information handling system 600 may be conducted via the wireless charging scheduling controller as the charging of the power storage device of the stylus is conducted as described as various embodiments herein. In various embodiments, the TX charging coil 646 may be formed in a charging puck, docking station, or other AC-connected device that may be specifically used to charge the power storage device within the information handling system.

Figure 7:
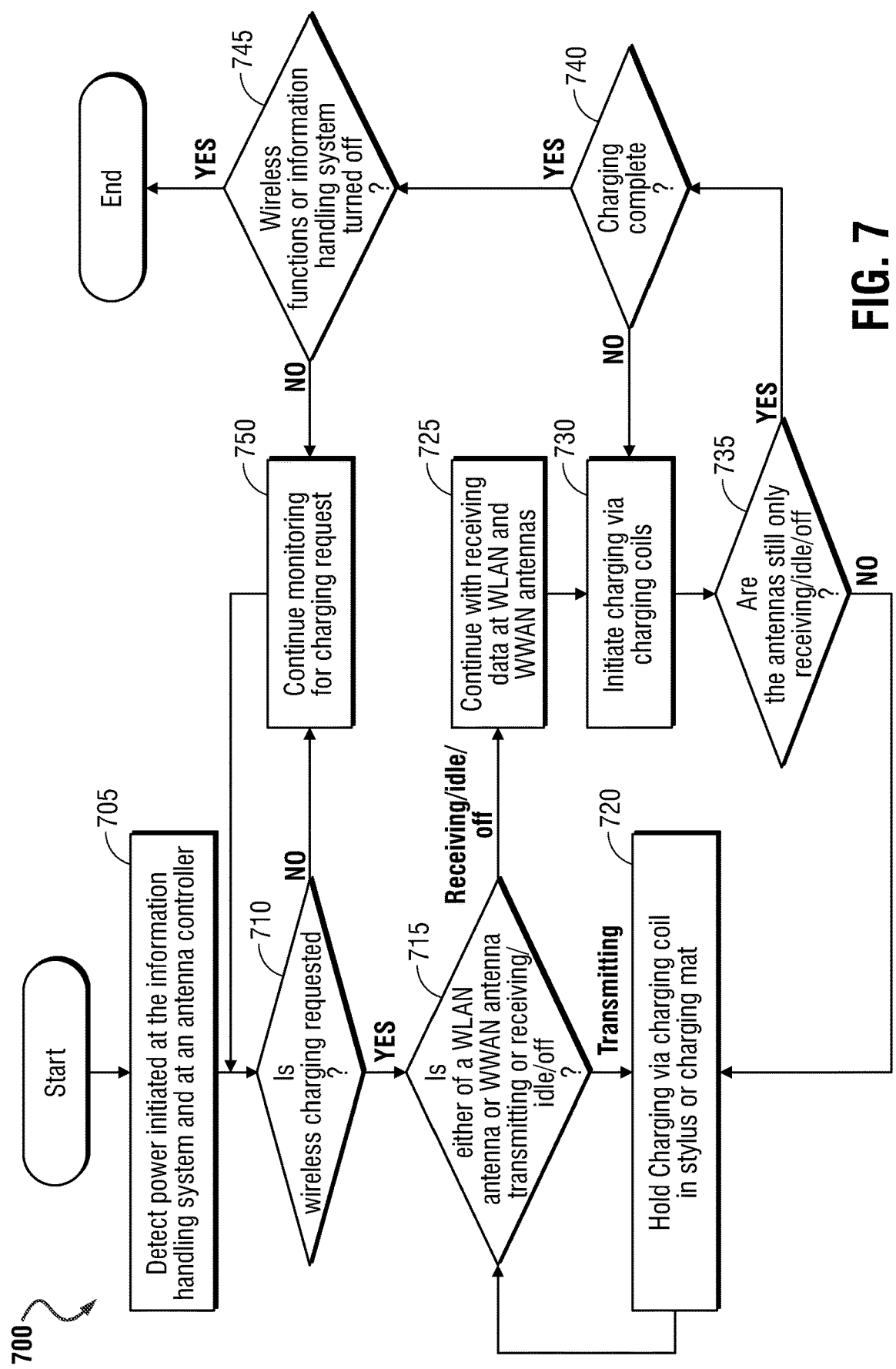
FIG. 7 is a flow diagram illustrating a method of operating a wireless charging scheduling system of an information handling system according to an embodiment of the present disclosure.

FIG. 7 is a flow diagram illustrating a method 700 of operating a wireless charging scheduling system of an information handling system according to an embodiment of the present disclosure. The method 700 may include detecting power being initiated at the information handling system and the antenna controller at block 705. This power initiation may, in an embodiment, be initiated by a user actuating a power on button associated with the information handling system. This initiation of power may include an embedded controller or other processing device initiating a BIOS and OS so that the user may interact with and provide input to the information handling system. Further, in an embodiment, the information handling system may detect the presence of any number of peripheral devices such as a keyboard, a trackpad or touchpad, a stylus, as well as output devices such as a video/graphic display device.

The method 700 may continue at block 710 with determining whether wireless charging is requested. This wireless charging request may come from a number of devices including any input/output devices such as a stylus or the information handling system (e.g., a PMU) as described herein. This request may be a result of the stylus or information handling system detecting a low power state within a power storage device of any input/output devices such as the stylus, in an example embodiment. The request may also come from a detection of any input/output devices such as the stylus near a charging coil within the information handling system indicating that the stylus is to be docked at a docking location or otherwise is to be charged in another embodiment. The request may also come from detection of a TX wireless charging coil of a charging mat or other charging device within proximity of an RX wireless charging coil of an information handling system triggering the PMU to charge.

Where no wireless charging request is received at block 710, the method 700 may continue with monitoring for a charging request at block 750. This monitoring may continue until either power is turned off at that information handling system or the request is detected.

Where a wireless charging request is detected at block 710, the method 700 may continue at block 715 with determining whether either of a WLAN antenna or a WWAN antenna is transmitting or receiving data. This determination may be made by an antenna controller as described herein. The antenna controller may create transmission scheduling data based on current and expected transmission and reception timings or indications of an idle antenna or the radio system is off. In this example, the transmission scheduling data describes when any radio is or will be transmitting data, receiving data, or idle/off with any of the plurality of WLAN antennas or WWAN antennas as described herein.

As described herein, this transmission scheduling data may be provided to a wireless charging scheduling controller used to direct a charging procedure and schedule with a TX charging coil. This data may be presented to the wireless charging scheduling controller at any number of intervals after a wireless charging request has been detected at block 710.

Where any of the plurality of WWAN antennas or WLAN antennas are transmitting data, the method 700 may include, at block 720, withholding charging via the TX charging coil in the stylus or charging mat as described herein. By holding charging at block 720, the method 700 waits until the WWAN antennas and WLAN antennas either as a group or any that are proximate to the TX charging coil for input/output devices or an RX charging coil for receiving charge from a charging mat or other charging device are placed in a receiving-only operation, idle state, or are detected as off. Until that happens, the determination at block 715 may be repeated.

Where some of the WWAN antennas and WLAN antennas are transmitting data and are, instead, receiving data or placed in a non-operational state, the method 700 continues as block 725 with the WLAN and/or WWAN antennas receiving data wirelessly from a network if in receiving operation. This wireless signal received during data reception, as described herein, limits the RF EM radiation emitted at the antennas to a substantially low level and contribute less or not at all to the SAR levels. The wireless charging scheduling controller may determine which antennas are proximate to either the TX coil in the information handling system to charge input/output devices or the RX coil in the information handling system chassis to receive wireless charge from a charging mat or other wireless charging device, and control charging at the coils depending on transmitting status of those proximate antennas.

At this point, the method 700 continues at block 730 with initiating a charging procedure via the charging coils described herein. Here, a wireless charging scheduling controller may, in an embodiment, receive the transmission scheduling data from the antenna controller and arrange a charging schedule as described herein. This is done in order to reduce the SAR levels experienced by the user at or around the charging coil and WLAN antenna and/or WWAN antenna. This transmission scheduling data describes when the radios associated with the WLAN and WWAN antennas are or will be transmitting and receiving data to and from the wireless network. The wireless charging scheduling controller may, at block 730, initiate a charging process only when the transmission scheduling data from the antenna controller indicates that the WLAN antenna and/or WWAN antenna are to receive data from the communications established between the information handling system and network or is idle or off. Indeed, as the WLAN antenna and/or WWAN antenna operatively communicate with either of a base station or wireless access point, the data transmission time and data reception time may be detailed in the transmission scheduling data provided to the wireless charging scheduling controller. As the transmission scheduling data is accessed by the wireless charging scheduling controller, the wireless charging scheduling controller may schedule when the charging coil is to operate thereby charging a power storage device of the stylus or within the information handling system. The wireless charging scheduling controller may transmit to the PMU to allow charging at the TX charging coil in the information handling system to charge an input/output device or receive inductive charge at the RX charging coil in the information handling system from an external wireless charging coil in the charging mat or other wireless charging device in various embodiments. In one embodiment, the wireless charging scheduling controller may communicate to the external wireless charging device via an NFC/Bluetooth link or other wireless link to allow charging. In an embodiment, the wireless link via radio and the information handling system may communicate to perform a handshake procedure prior to initiating a charging procedure by the wireless charging scheduling controller. In the embodiments described herein, the TX charging coils and RX charging coils cooperate to transfer power to a battery within the information handling system 100 until charging is complete.

As described herein, the stylus may include a RX charging coil. This RX charging coil receives a fluctuating magnetic field emitted from the TX input/output charging coil at the information handling system. This fluctuating magnetic field is converted back into alternating current at the RX charging coil of the stylus and, in an embodiment, converted into DC via a rectifier and used to either power the stylus or charge a power storage device in the stylus.

In an embodiment, the information handling system may be inductively coupled to a charging mat, charging puck, docking device, or other wireless charging device and used to charge a battery within the information handling system. The charging mat, charging puck, docking device, or other wireless charging device may also include a transmitting charging coil to inductively provide charge to the RX charging coil in the information handling system. The charging mat or other charging device may, in an embodiment, be operatively coupled to the wireless charging scheduling controller via a wired connection or a wireless link to the information handling system in various embodiments. In an embodiment, the charging mat or other wireless charging device may be placed under the information handling system and include a wired communication line or wireless link operatively coupled to a docking station to which the information handling system is docked. The placement of the TX charging coil of the charging mat or other charging device may be situated so as to be operatively coupled to a RX charging coil within the information handling system as described in connection with FIG. 1. The RX charging coil within the information handling system may be operatively coupled, in an embodiment, to the battery associated with the PMU as described herein. The wireless connection, such as an NFC link, between the charging mat or other wireless charging device and the information handling system may allow the wireless charging scheduling controller to use the transmission scheduling data received from the antenna controller to also operate the transmitting charging coil within the charging mat or other wireless charging device to control charging the battery in the information handling system. A similar process of inductively charging the battery of the information handling system may be conducted via the wireless charging scheduling controller as described above herein.

The method 700 may further include, at block 735, with determining is the WWAN and WLAN antennas are still only receiving, or idle, or off. Where the WWAN and WLAN antennas are no longer only receiving data, idle, or off and instead have engaged in a transmission process, the method 700 continues at block 720 with holding charging until both of the WWAN and WLAN antennas are only receiving are idle or detected as off.

Where the antennas still are only receiving data at block 735, the method 700 includes determining whether charging of the power storage device in the stylus or battery in the information handling system is completed at block 740. A completion of charging these batteries may be based on whether a power storage level at the batteries has been reached. This level may be set by the user and may be as high as 100% or lower. Where charging has not been completed at block 740, the method 700 continues at block 730 with maintaining the charging process.

Where charging has been completed at block 740, the method 700 includes, at block 745, determining whether the wireless functions or the information handling system itself has been turned off. Where the wireless functions are continuing to be operated, the method 700 may continue at block 750 with continuing to monitor for a charging request as described herein. Where either the wireless functions or the information handling system itself have been turned off, the method may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system with a wireless charging device, comprising:
   a processor;
   a memory;
   a power management unit (PMU);
   an antenna controller to provide instructions to a radio to cause an antenna to transceive wirelessly with a network;
   a wireless charging scheduling controller configured to:
      receive transmission scheduling data from the antenna controller descriptive of when the radio is transmitting and receiving data to and from the network; and
      initiate, at a charging coil of the wireless charging device, a charging procedure to wirelessly charge a power storage device when the transmission scheduling data indicates that the radio is receiving data from the network or is idle.

2. The information handling system of claim 1 further comprising:
   the power storage device includes a battery within a stylus.

3. The information handling system of claim 1 further comprising:
   the power storage device includes a battery operatively coupled to the PMU within the information handling system; and
   the charging coil is a receiving charging coil wirelessly coupled to an external, transmitting charging coil.

4. The information handling system of claim 1, wherein the radio is a cellular radio, and the information handling system further includes a Wi-Fi radio.

5. The information handling system of claim 1 further comprising:
   the wireless charging scheduling controller to receive data descriptive of a completion of charging of the power storage device and pausing the charging procedure until a charging request is received by the wireless charging scheduling controller.

6. The information handling system of claim 5, wherein the charging request is initiated after the power storage device has reached a threshold depletion level.

7. The information handling system of claim 5, wherein the charging request is initiated after a stylus to be charged by the charging coil has been coupled to a housing associated with the stylus.

8. The information handling system of claim 1 further comprising:
   the charging coil is a receiving charging coil formed in the information handling system to charge the power storage device; and
   the wireless charging scheduling controller is communicatively coupled to an external charging device to control the charging procedure by a transmitting charging coil thereon depending on a transmission status of the antenna.

9. A power storage device charger of an information handling system, comprising:
   a wireless charging scheduling controller configured to:
      receive transmission scheduling data from an antenna controller of the information handling system descriptive of when a radio and corresponding antenna is transmitting and receiving data to and from a network or when the radio is idle; and
      initiate, at a charging coil, a charging procedure to wirelessly charge a power storage device when the transmission scheduling data indicates that the transmissions of data at the radio and the corresponding antenna have been paused by an idle status or when in a receiving data status; and the power storage device to receive power via inductive charging at the charging coil.

10. The power storage device charger of claim 9 further comprising:

the power storage device is a battery within a stylus; and a receiver charging coil in the stylus is configured to receive inductive charging from the charging procedure.

11. The power storage device charger of claim 9 further comprising:

the power storage device is a battery operatively coupled to a PMU within the information handling system; and the charging coil is a receiving charging coil receiving inductive charging from an external transmitting charging coil.

12. The power storage device charger of claim 11 further comprising:

the external transmitting charging coil formed into a charging mat and placed under a chassis of the information handling system near a receiving charging coil of the information handling system to charge the power storage device.

13. The power storage device charger of claim 9, wherein the radio is a Wi-Fi radio, and the information handling system further includes a cellular radio.

14. The power storage device charger of claim 9 further comprising:

the wireless charging scheduling controller to receive data descriptive of a completion of charging of the power storage device and pausing the charging procedure until a charging request is received by the wireless charging scheduling controller.

15. The power storage device charger of claim 9 further comprising:

the wireless charging scheduling controller to pause the charging procedure when the transmission scheduling data indicates at least one antenna proximate to the charging coil is or will be transmitting a wireless signal.

16. The power storage device charger of claim 9 further comprising:

the wireless charging scheduling controller to continue the charging procedure when the transmission scheduling data indicates no antenna proximate to the charging coil is or will be transmitting a wireless signal.

17. A method of operating a wireless charging device of an information handling system, comprising:

detecting power initiated at the information handling system and at an antenna controller;

at a wireless charging scheduling controller:

receiving transmission scheduling data from an antenna controller descriptive of when a radio is transmitting and receiving data to and from a network; and initiating, at a charging coil of the wireless charging device, a charging procedure to wirelessly charge a power storage device when the transmission scheduling data indicates that the radio has paused transmissions of data.

18. The method of claim 17 further comprising:

receiving data descriptive of a completion of charging of the power storage device to a threshold level; and pausing the charging procedure until a charging request is received by the wireless charging scheduling controller.

19. The method of claim 18 further comprising further comprising the charging request initiated after the power storage device has reached a threshold depletion level.

20. The input device of claim 18 further comprising:

initiating the charging request after a stylus to be charged by the charging coil has been coupled to a housing associated with the stylus.

* * * * *